United States Patent
Seki

(10) Patent No.: US 7,623,148 B2
(45) Date of Patent: Nov. 24, 2009

(54) OPTICAL SCANNING APPARATUS, METHOD OF CONTROLLING AMOUNT OF LIGHT, AND IMAGE FORMING APPARATUS

(75) Inventor: Yuichi Seki, Saitama (JP)

(73) Assignee: Canon Kabushiki Kaisha (JP)

( * ) Notice: Subject to any disclaimer, the term of this patent is extended or adjusted under 35 U.S.C. 154(b) by 1 day.

(21) Appl. No.: 12/108,864

(22) Filed: Apr. 24, 2008

(65) Prior Publication Data

US 2008/0266375 A1  Oct. 30, 2008

(30) Foreign Application Priority Data

Apr. 27, 2007  (JP) .............................. 2007-119618

(51) Int. Cl.
  *B41J 2/435* (2006.01)
  *B41J 2/47* (2006.01)
(52) U.S. Cl. ...................................... 347/237; 347/247
(58) Field of Classification Search ................. 347/132, 347/240, 251–254, 135, 236, 237, 246, 247; 399/46–56, 74
See application file for complete search history.

(56) References Cited

U.S. PATENT DOCUMENTS 6,114,682 A * 9/2000 Minakuchi et al. .......... 250/205
6,466,244 B2 * 10/2002 Itoh ........................... 347/132
7,268,797 B2 9/2007 Hata et al.
2007/0159657 A1 * 7/2007 Nakano et al. ............. 358/3.13
2007/0291101 A1 12/2007 Hata et al.
2008/0253793 A1 * 10/2008 Ishibashi et al. ............... 399/74

FOREIGN PATENT DOCUMENTS

JP  2005-262485 A  9/2005

* cited by examiner

*Primary Examiner*—Hai C Pham
(74) *Attorney, Agent, or Firm*—Rossi, Kimms & McDowell LLP

(57) ABSTRACT

An optical scanning apparatus includes an approximation formula determination unit, a sensitivity correction value determination unit and a bias current controller. The approximation formula determination unit determines an nth-order approximation formula and an mth-order approximation formula, which represent the sensitivity characteristic of the image carrier along the main-scanning direction thereof, from sensitivity data representing the sensitivity of each area obtained by dividing the surface of the image carrier into a plurality of areas. The sensitivity correction value determination unit determines a sensitivity correction value, which is a correction value of sensitivity in each area, from the nth-order approximation formula and mth-order approximation formula. The bias current controller controls a bias current in accordance with the sensitivity correction value. A switching current controller controls a switching current in accordance with the sensitivity correction value and a current value that is for obtaining a target amount of light.

5 Claims, 16 Drawing Sheets

F I G. 10A
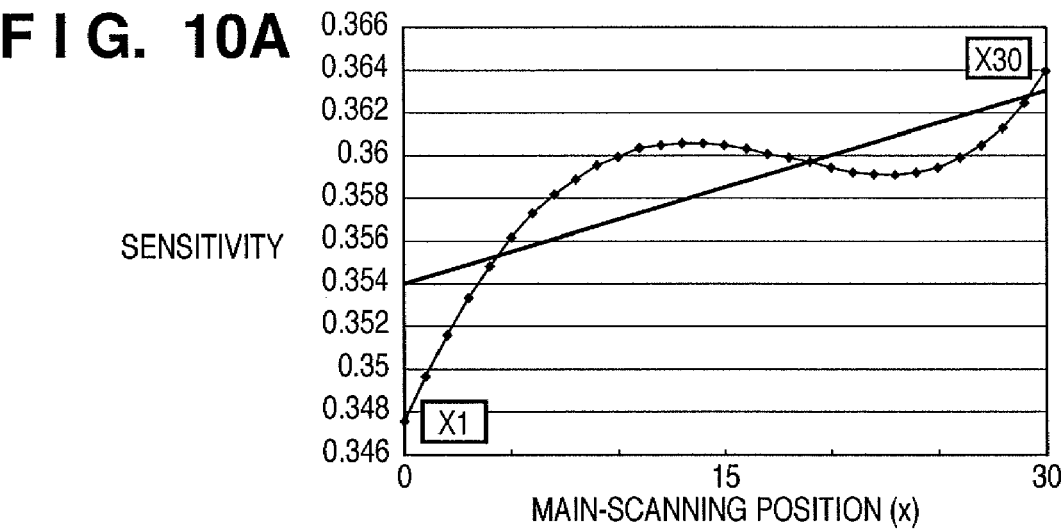
F I G. 10B
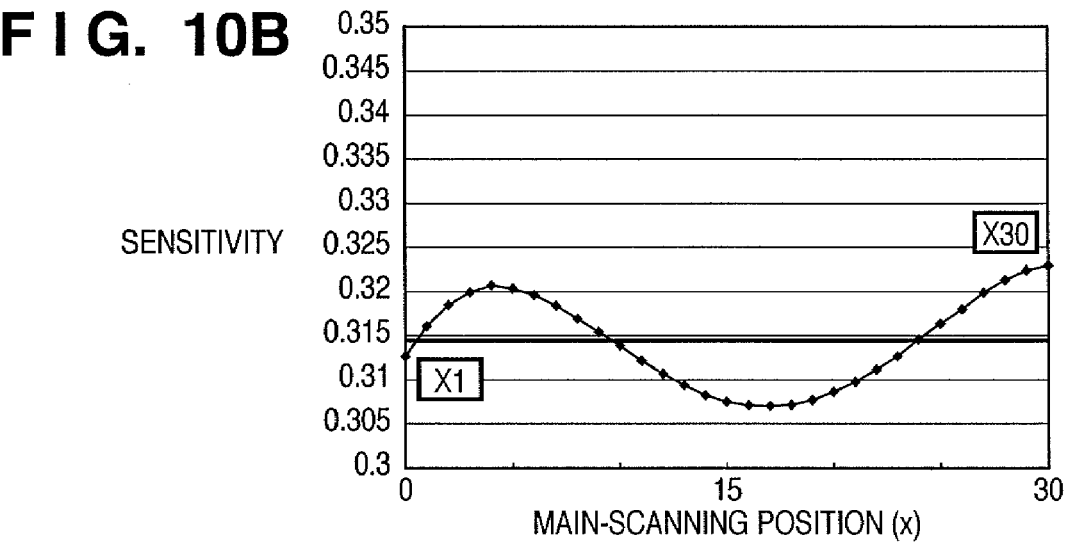
F I G. 10C
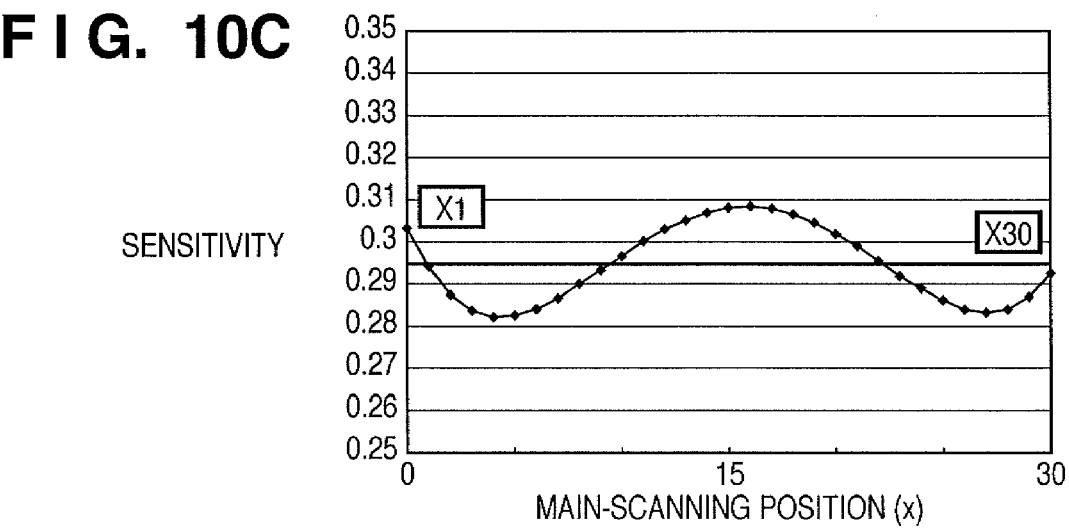

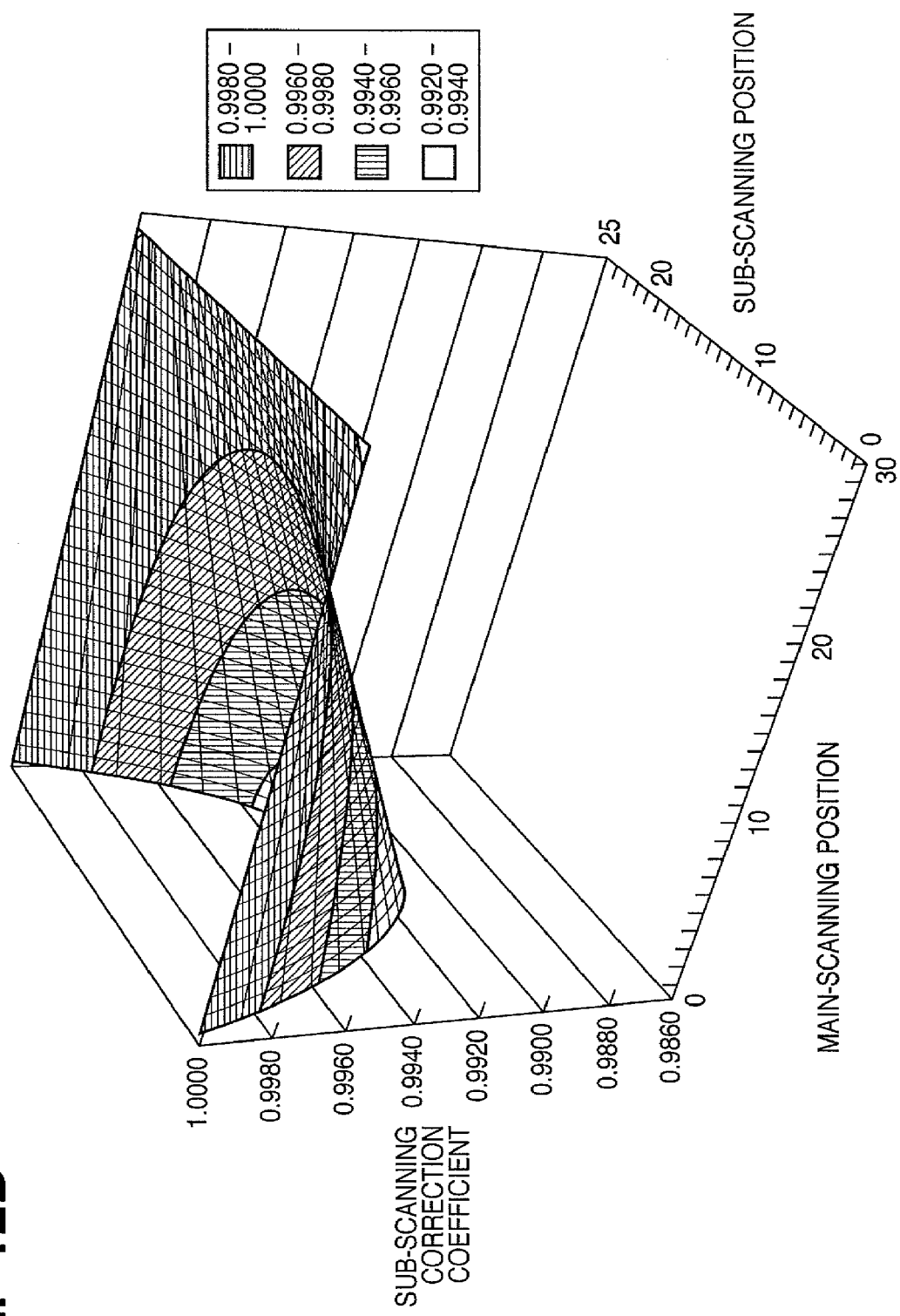

OPTICAL SCANNING APPARATUS, METHOD OF CONTROLLING AMOUNT OF LIGHT, AND IMAGE FORMING APPARATUS

BACKGROUND OF THE INVENTION

1. Field of the Invention

The present invention relates to a method of controlling an amount of light in an optical scanning apparatus used in an image forming apparatus.

2. Description of the Related Art

In an electrophotographic-type image forming apparatus, an important factor in terms of maintaining image quality is to perform precise control of the amount of light in an optical scanning apparatus that outputs a laser beam for forming an electrostatic latent image. Generally, in control of the amount of light, what is controlled is the relationship between a driving current applied to the light source and the amount of light in the light beam emitted from the light source.

In an optical scanning apparatus, generally the FFP (Far-Field Pattern) and optical axis fluctuate in accordance with differences in image height (scanning position in a main-scanning direction of photosensitive member) and amount of light. On the other hand, in accordance with Japanese Patent Laid-Open No. 2005-262485, one scanning line is divided into a plurality of correction intervals and correction data in each correction interval is determined. Further, Japanese Patent Laid-Open No. 2005-262485 proposes that correction data applied to any image height be calculated by interpolation processing and that the amount of light be calculated using the calculated correction data.

In accordance with the invention described in the specification of Japanese Patent Laid-Open No. 2005-262485, the amount of light with which a photosensitive drum is irradiated can probably be made uniform. However, in order to achieve a greater improvement in image quality, a uniform surface potential (dark potential or highlight potential) of the latent image formed on the photosensitive drum is required. If the surface potential cannot be made uniform, an unevenness in density will occur when the latent image is developed as by toner. This is undesirable.

In general, obtaining a constant sensitivity characteristic in all areas on the surface of a photosensitive drum is exceedingly difficult in terms of the manufacturing process. The reason is that since a photoconductive layer is formed on the photosensitive drum while the photosensitive drum is being rotated, the film thickness of the photoconductive layer cannot be rendered constant owing to uneven vacuum deposition. Preferably, therefore, the amount of light in each area of the drum surface should be corrected taking into consideration the fact that the sensitivity characteristic of the photosensitive drum is not uniform.

SUMMARY OF THE INVENTION

Accordingly, the present invention seeks to solve at least one problem among this and other problems. For example, the present invention seeks to uniformalize the surface potential of dark or highlight portions of a latent image, which is formed on an image carrier, by correcting the amount of light in accordance with a sensitivity characteristic that is uneven in areas across the image carrier. Other problems will be understood from the entirety of the specification.

The present invention is applicable to an optical scanning apparatus for irradiating an image carrier with a light beam emitted from a light source. By way of example, the optical scanning apparatus includes an approximation formula determination unit, a sensitivity correction value determination unit and a bias current controller. The approximation formula determination unit determines an nth-order approximation formula and an mth-order approximation formula (where n and m are natural numbers and m>n holds), which represent the sensitivity characteristic of the image carrier along the main-scanning direction thereof, from sensitivity data representing the sensitivity of each area obtained by dividing the surface of the image carrier into a plurality of areas. The sensitivity correction value determination unit determines a sensitivity correction value, which is a correction value of sensitivity in each area, from the nth-order approximation formula and mth-order approximation formula. The bias current controller controls a bias current, which is applied to the light source, in accordance with the sensitivity correction value.

The optical scanning apparatus further includes an amount-of-light controller and a switching current controller. The amount-of-light controller controls the amount of light, which is output from the light source, so as to obtain a target amount of light. The switching current controller controls a switching current, which is applied to the light source, in accordance with the sensitivity correction value and a current value that is for obtaining the target amount of light determined by the amount-of-light controller.

Further features of the present invention will become apparent from the following description of exemplary embodiments with reference to the attached drawings.

BRIEF DESCRIPTION OF THE DRAWINGS

FIGS. 10A to 10C are diagrams illustrating examples of a fourth-order approximation formula and a first-order approximation formula determined with regard to an 24th (X) row;

FIGS. 12A to 12C are diagrams illustrating examples of sub-scan correction coefficients;

DESCRIPTION OF THE EMBODIMENTS

Embodiments of the present invention will be illustrated below. The individual embodiments described below will be useful in order to understand various concepts of the present invention, such as broader, intermediate and narrower concepts thereof. Further, the technical scope of the present invention is determined by the scope of the claims and is not limited by the individual embodiments set forth below.

First Embodiment

[Configuration of Apparatus]

Figure 1:
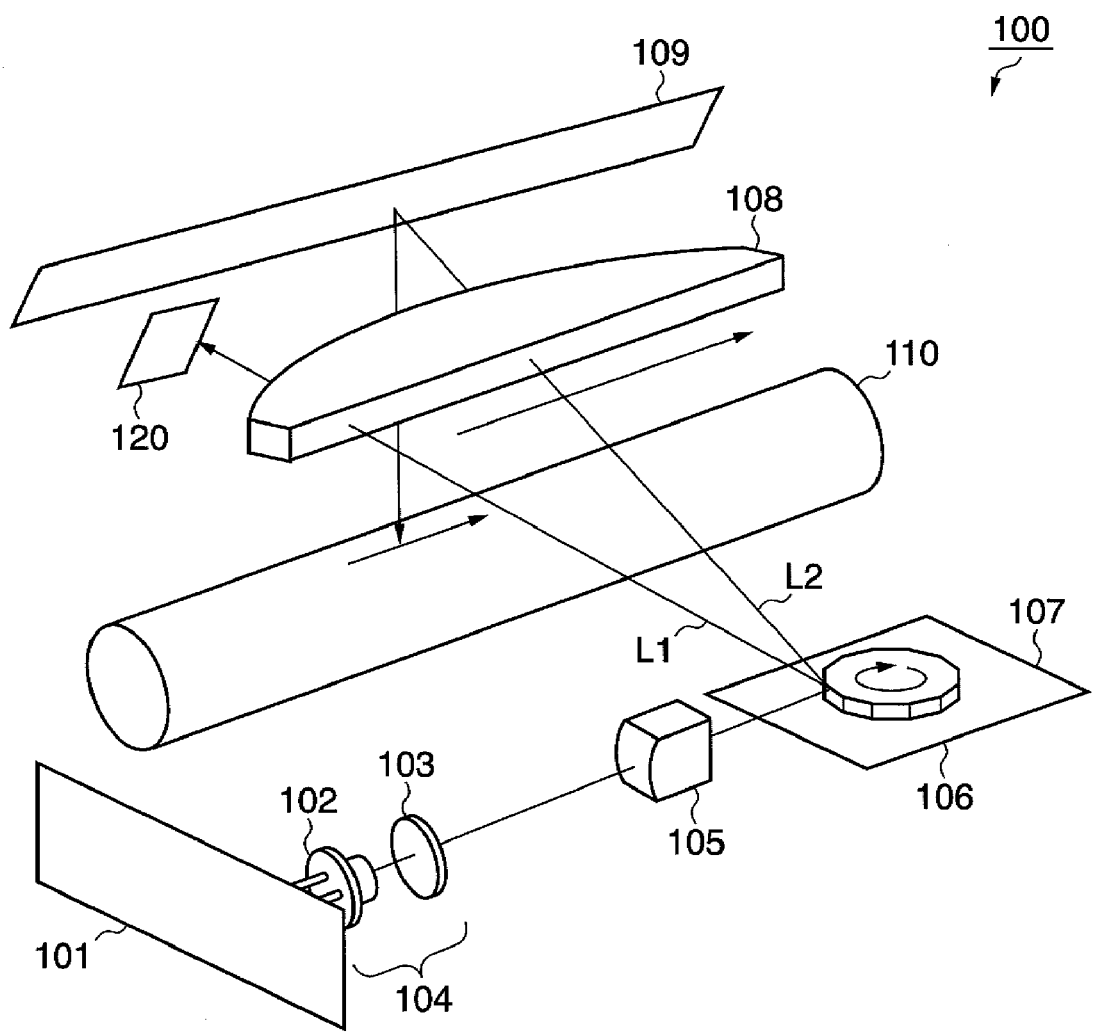
FIG. 1 is a diagram illustrating an optical scanning apparatus according to an embodiment of the present invention.

FIG. 1 is a diagram illustrating an optical scanning apparatus 100 according to an embodiment of the present invention. The optical scanning apparatus 100, which has a light source for irradiating an image carrier with a light beam, is also referred to as an exposure apparatus or scanner apparatus. The optical scanning apparatus 100 has a laser unit 104 constituted by a laser driving unit 101, a semiconductor laser 102 and a collimator lens 103. It should be noted that the semiconductor laser 102 is merely one example of a light source for outputting a light beam and that light sources of other types may be employed.

The laser beam (light beam) emitted from the semiconductor laser 102 arrives at a polygonal mirror 106 upon passing through a cylindrical lens 105. The polygonal mirror 106 is one example of a rotating polygonal mirror for deflecting the laser beam while rotating so as to scan the laser beam across the image carrier. A scanner motor unit 107 drives the polygonal mirror 106 so as to rotate the polygonal mirror 106 at a uniform angular speed. The laser beam deflected by the polygonal mirror 106 impinges upon an f-θ lens 108. Laser beam L2 that has passed through the f-θ lens 108 is reflected by a reflecting mirror 109 and is scanned across the surface of a photosensitive drum 110, thereby exposing the surface to light. It should be noted that the f-θ lens 108 converts the laser beam L2 in such a manner that the path of the laser beam L2 undergoes motion at a constant velocity in a direction (main-scanning direction) at right angles to the direction (sub-scanning direction) in which the photosensitive drum 110 rotates. An electrostatic latent image is formed on the surface of the photosensitive drum 110 by the laser beam L2.

On the other hand, a laser beam L1 is a laser beam at an edge portion of the scanning range of the laser beam. The laser beam L1 is not used in image formation. Instead, the laser beam L1 is received by a BD sensor 120. Here "BD" is the abbreviation of "beam detection". The output signal from the BD sensor 120 is utilized as image-write timing.

Figure 2:
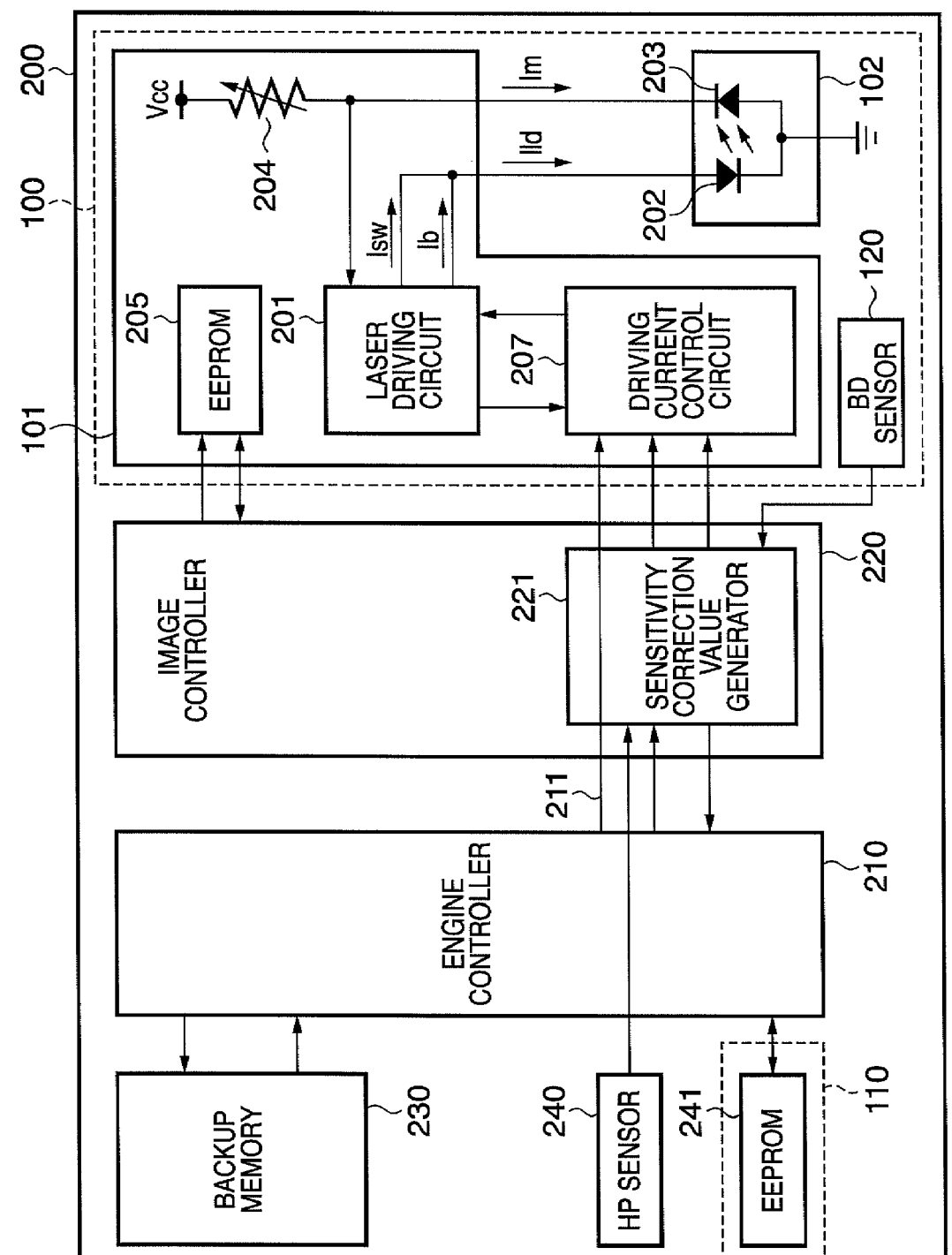
FIG. 2 is a block diagram of a controller of an image forming apparatus according to the embodiment.

FIG. 2 is a block diagram of a controller of an image forming apparatus according to this embodiment. Components in FIG. 2 similar to those shown in FIG. 1 are designated by like reference characters. The image forming apparatus is equipped with the optical scanning apparatus 100. The optical scanning apparatus 100 is used in order to form an electrostatic latent image by scanning the surface of the image carrier with a light beam conforming to image information.

A laser driving circuit 201 controls the driving current of the semiconductor laser 102, whereby the semiconductor laser 102 is caused to emit light steadily in a prescribed amount (intensity). The semiconductor laser 102 has a laser diode (LD) 202 and a photodiode (PD) 203. The LD 202 is a light source that outputs a laser beam. The PD 203 is a measuring element for measuring the amount of light in the laser beam. The laser driving circuit 201 outputs a driving current Ild to the LD 202. The driving current Ild conforms to the amount of light (a PD current Im) measured by the PD 203. An amount-of-light adjusting variable resistor 204 converts the PD current Im to a voltage value, generates a PD voltage signal and outputs this signal to the laser driving circuit 201.

An EEPROM 205 is a non-volatile storage device. A driving current control circuit 207 is a control circuit for controlling the laser driving circuit 201 in accordance with various signals received from an image controller 220.

An engine controller 210 is a control unit for controlling the image controller 220, receiving information, which is output from the EEPROM 205, via the image controller 220 and storing this information in a backup memory 230. In accordance with this embodiment, the engine controller 210 functions as a determination unit for determining an amount-of-light adjustment value. The amount-of-light adjustment value is uniformly applied to each image height on the image carrier and represents the driving current supplied to the light source. The engine controller 210 generates an amount-of-light setting signal 211 and outputs the signal to the image controller 220. The amount-of-light setting signal 211 is a signal for conveying an amount-of-light setting value that is used in order to set the amount of light in LD 202.

Further, the engine controller 210 reads out sensitivity data, which has been stored in an EEPROM 241 provided for the photosensitive drum 110, and stores the sensitivity data in the backup memory 230. The EEPROM 241 is one example of a storage unit provided for the image carrier in order to store the sensitivity data. Further, the engine controller 210 is connected to an HP (home position) sensor 240 for sensing a reference home position of the photosensitive drum 110 along the sub-scanning direction of the photosensitive drum 110. The signal (HP signal) indicating the home position sensed by the HP sensor 240 is transferred to the image controller 220 and is utilized in order to determine image-write timing. The HP signal is output once per revolution of the photosensitive drum 110.

The image controller 220 is one control unit with which the image forming apparatus is equipped and serves as a bridge for data between the engine controller 210 and optical scanning apparatus 100. For example, the image controller 220 outputs data and information, which has been read out of the EEPROM 205, to the engine controller 210, generates various control signals and outputs these signals to the laser driving circuit 201.

A sensitivity correction value generator 221 generates a sensitivity correction value (main-scan correction coefficient and sub-scan correction coefficient) for correcting the amount of light in accordance with the sensitivity characteristic of the image carrier and outputs this value to the optical scanning apparatus 100. The sensitivity correction value generator 221 is one example of an approximation formula determination unit for determining an nth-order approximation formula and an mth-order approximation formula (where n and m are natural numbers and m>n holds), which represent the sensitivity characteristic of the image carrier along the main-scanning direction thereof, from sensitivity data representing the sensitivity of each area obtained by dividing the surface of the image carrier into a plurality of areas. The sensitivity correction value generator 221 is one example of a sensitivity correction value determination unit for determining a sensitivity correction value, which is a correction value of sensitivity in each area, from the nth-order approximation formula and mth-order approximation formula.

Figure 3:
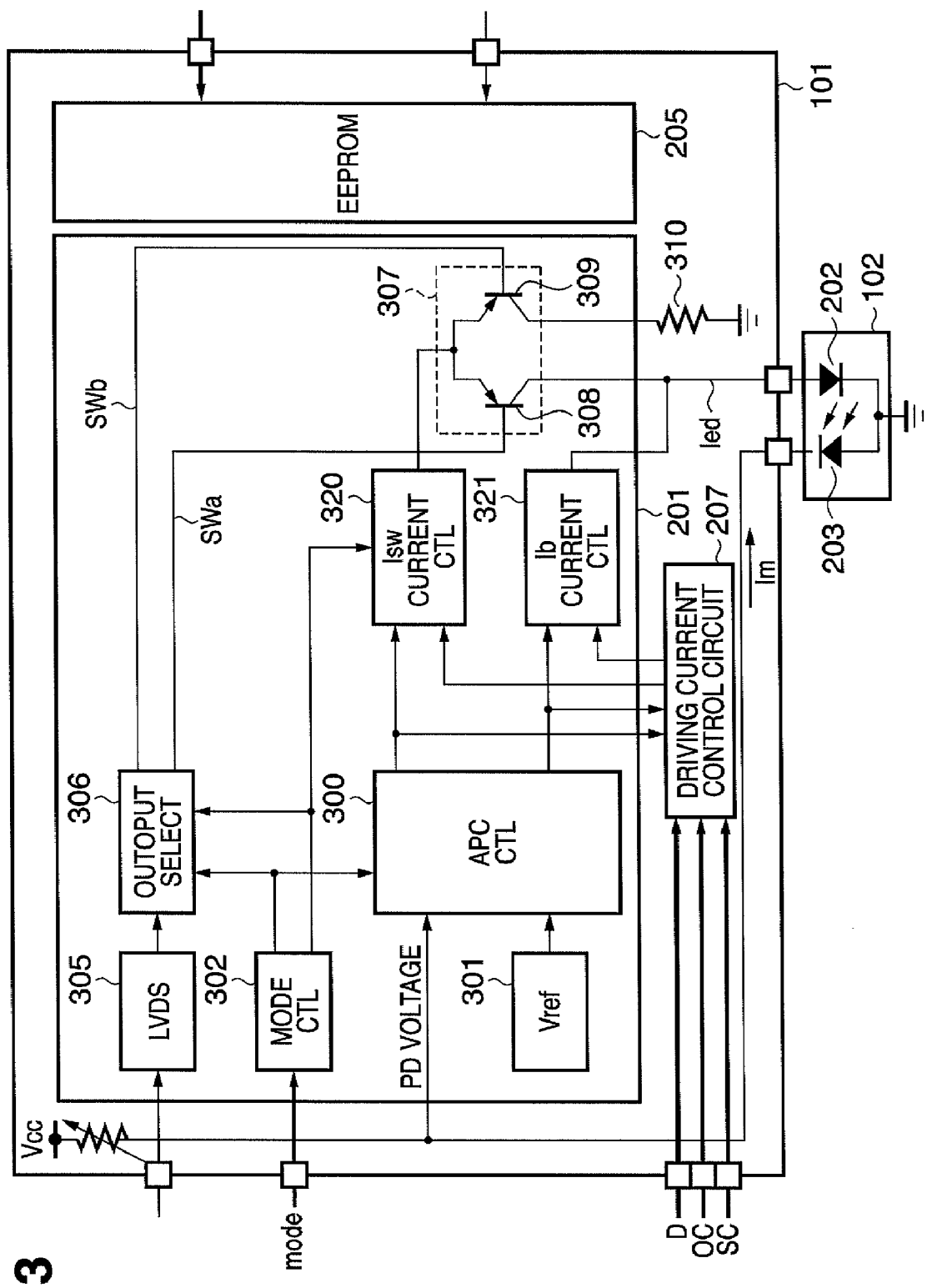
FIG. 3 is a block diagram illustrating the details of a laser driving unit according to the embodiment.

FIG. 3 is a block diagram illustrating the details of the laser driving unit according to this embodiment. An amount-of-light control circuit (APC CTL) 300 is a circuit that is at the center of control of amount of light. Input to the amount-of-light control circuit (APC CTL) are a PD voltage signal corresponding to the above-mentioned PD current Im, and a reference voltage that has been output from a reference voltage generating circuit (Vref) 301.

A mode control circuit 302 is a circuit for switching among a plurality of control modes in accordance with a mode control signal that enters from the image controller 220. Examples of the plurality of modes are an amount-of-light adjustment mode, a current retention mode, a data output mode and a sample mode.

The amount-of-light adjustment mode is used in that part of the laser-beam scanning period that is a non-image forming interval, namely an interval in which an image is not formed. The current retention mode and a data output mode are used in that part of the laser-beam scanning period that is an image forming interval, namely an interval in which an image is formed. The mode control circuit 302 supplies the amount-of-light control circuit 300, etc., with a signal indicating which mode is being applied.

In a case where the amount-of-light adjustment mode has been set, the amount-of-light control circuit 300 compares the PD voltage signal and the reference voltage and increases or decreases the set value of switching current Isw in accordance with the result of the comparison. In accordance with the set value of switching current, a switching current control circuit (Isw CURRENT CTL) 320 adjusts the driving current Ild supplied to the LD 202. As a result, the amount of light of the laser beam that is output from the LD 202 can be controlled to obtain a prescribed amount of light. Thus, the amount-of-light control circuit 300 is one example of an amount-of-light controller for controlling, to a target value, the amount of light that is output from the light source.

Further, the amount-of-light control circuit 300 determines the set value of bias current Ib. For example, the amount-of-light control circuit 300 determines a driving current value, which is for achieving an amount of light that is one-fourth the target amount of light, as a light-emission starting current value, and either divides the light-emission starting current value by a prescribed current value or subtracts the latter from the former to thereby determine the set value of bias current Ib.

The switching current control circuit 320 generates and outputs the driving signal of a current driver based upon the set value of switching current and a correction value of switching current. The correction value of switching current is data that is output by the driving current control circuit 207 in accordance with the sensitivity correction value (=main-scan correction coefficient). Thus, the switching current control circuit 320 is one example of a switching current controller for controlling the switching current applied to the light source in accordance with the sensitivity correction value and the current value that is for obtaining the target amount of light.

A bias current control circuit 321 generates and outputs bias current based upon the set value of bias current and correction value of bias current. The correction value of bias current is data that is output by the driving current control circuit 207 in accordance with the sensitivity correction value (sub-scan correction coefficient). The bias current that has been output from the bias current control circuit 321 is added to an output signal that has been output from a current driver 307 to obtain the driving current Ild. It should be noted that the bias current control circuit 321 is one example of a bias current controller for controlling bias current applied to the light source in accordance with the sensitivity correction value. The correction value of bias current corresponds to the sensitivity correction value, described later.

In a case where the current retention mode has been set, the amount-of-light control circuit 300 maintains the set value of switching current, which has been set in the immediately preceding amount-of-light adjustment mode. In a case where the data output has been set, the switching current control circuit 320 outputs a driving current conforming to a differential data signal that enters from the image controller 220 and the set value of switching current that is output from the amount-of-light control circuit 300.

A differential receiver (LVDS) 305 is a circuit for receiving the differential data signal, which enters from the image controller 220. In accordance with the mode designated in the mode control circuit 302, an output selection circuit (OUTPUT SELECT) 306 turns on and off switching signals SWa, SWb that are output to the current driver 307. For example, when the sample mode has been designated, the switching signal SWa is turned on and the switching signal SWb is turned off. When the data output mode has been designated, the switching signals SWa and SWb are output in accordance with the differential output signal that is output from the differential receiver 305.

The current driver 307 is a differential amplifier circuit in which a first transistor 308 and a second transistor 309 have their emitter terminals connected together. The signal that is output by the switching current control circuit 320 is input to the emitter terminals. The switching signal SWa is input to the base terminal of the first transistor 308. The switching signal SWb is input to the base terminal of the second transistor 309. Thus, the first transistor 308 drives the switching of the LD 202 based upon these signals. The second transistor 309 drives the switching of a load resistor 310 based upon the signal output by the switching current control circuit 320 and the switching signal SWb.

Figure 4:
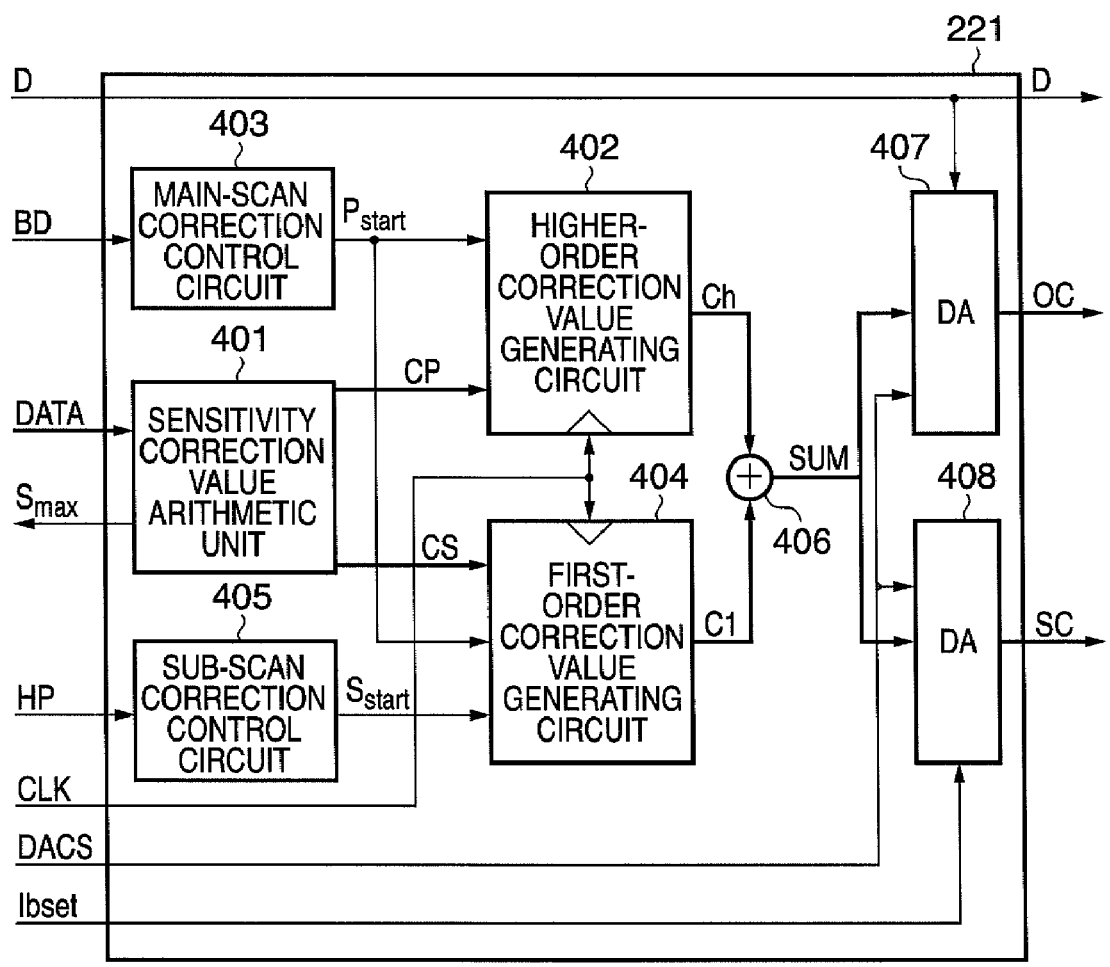
FIG. 4 is a block diagram exemplifying a sensitivity correction value generator according to the embodiment.

FIG. 4 is a block diagram exemplifying the sensitivity correction value generator according to this embodiment. A sensitivity correction value arithmetic unit 401 reads out sensitivity data (DATA), which has been stored in the backup memory 230, through the engine controller 210. The sensitivity correction value arithmetic unit 401 therefore is one example of a readout unit for reading sensitivity data out of the storage unit with which the image carrier is provided. The sensitivity correction value arithmetic unit 401 has an input device and communication device as an input unit for inputting sensitivity data.

The sensitivity correction value arithmetic unit 401 generates a main-scan correction coefficient CP and sub-scan correction coefficient CS in accordance with a method of determining a sensitivity correction value, described later. The sensitivity correction value arithmetic unit 401 calculates a maximum value $S_{max}$ of sensitivity and outputs this value to the engine controller 210. The latter generates an amount-of-light correction value D and a set value $Ib_{set}$ of bias current from the entered maximum value of sensitivity. For example, the amount-of-light adjustment value D is determined to be a value that is 100% of the maximum value $S_{max}$ of sensitivity. Further, the set value $Ib_{set}$ of bias current is determined to be a value that is 10% of the maximum value $S_{max}$ of sensitivity.

A higher-order correction value generating circuit 402 generates a higher-order correction value Ch from the main-scan correction coefficient CP, which has entered from the sensitivity correction value arithmetic unit 401, upon detecting a main-scan correction starting signal $P_{start}$, which is output from a main-scan correction control circuit 403. The higher-order correction value generating circuit 402 outputs the higher-order correction value Ch in sync with a correction control clock CLK. The main-scan correction control circuit 403 outputs the main-scan correction starting signal $P_{start}$ when the MD signal enters from the BD sensor 120.

A first-order correction value generating circuit 404 generates a first-order correction value C1 from the sub-scan correction coefficient CS, which has entered from the sensitivity correction value arithmetic unit 401, upon detecting a sub-scan correction starting signal $S_{start}$, which is output from a sub-scan correction control circuit 405. The first-order correction value generating circuit 404 outputs the first-order correction value C1 in sync with the correction control clock CLK. An adder 406 adds the higher-order correction value Ch and the first-order correction value C1 and outputs the sum as an output value SUM.

A first digital-to-analog converter (DA) 407 generates and outputs a sensitivity correction value SC in accordance with a control signal DACS that has entered from the engine controller 210. For example, the first digital-to-analog converter 407 converts the output value SUM from the adder 406 to an amount-of-light correction value OC, which is an analog value, using as a reference voltage (maximum voltage) the amount-of-light correction value D that has entered from the engine controller 210.

A second digital-to-analog converter (DA) 408 generates and outputs an amount-of-light correction value OC in accordance with the control signal DACS that has entered from the engine controller 210. For example, the second digital-to-analog converter 408 converts the digital output value SUM from the adder 406 to a digital sensitivity correction value SC using as a reference voltage the set value $Ib_{set}$ of bias current that has entered from the adder 406.

[Causes of Sensitivity Unevenness]

Figure 5A:
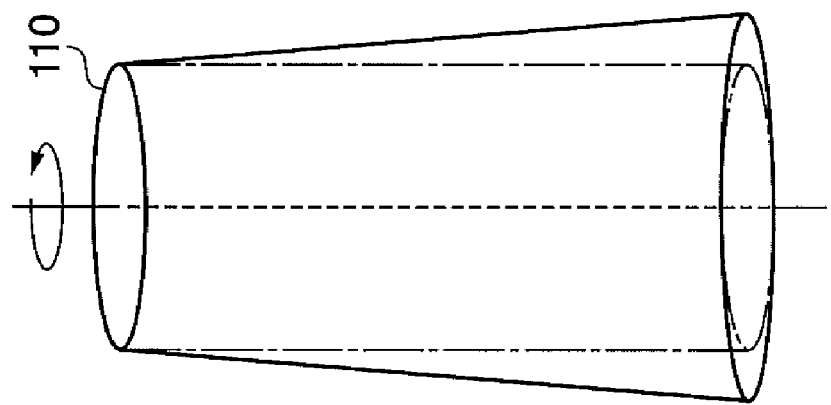
FIGS. 5A to 5C are diagrams useful in describing a mechanism whereby sensitivity unevenness occurs on a photosensitive drum.
Figure 5B:
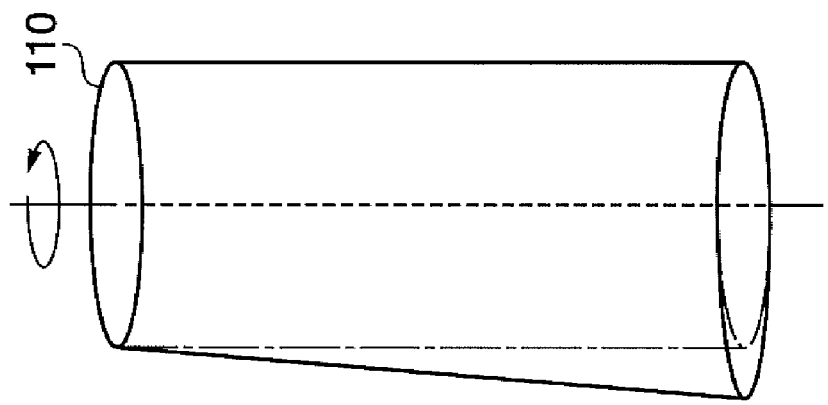
Figure 5C:
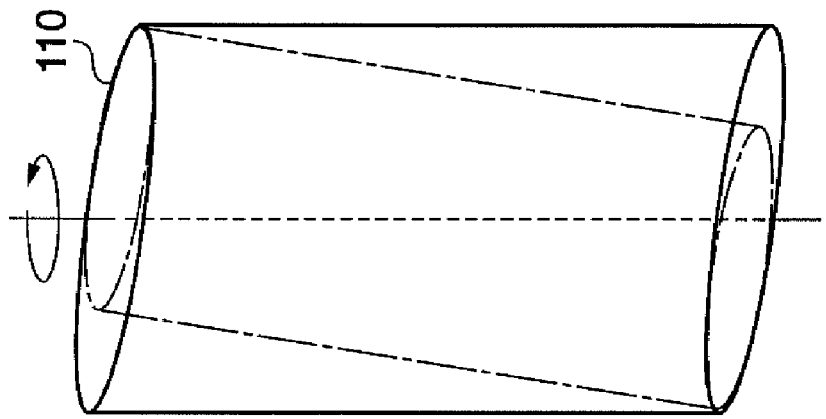

FIGS. 5A, 5B and 5C are diagrams for describing a mechanism whereby sensitivity unevenness occurs on a photosensitive drum. One cause of sensitivity unevenness of the photosensitive drum 110 is a variation in film thickness ascribable to unevenness in vapor deposition in a vapor-deposition manufacturing process.

FIG. 5A in particular illustrates a variation in film thickness that occurs owing to unevenness in vapor deposition. In general, unevenness in vapor deposition occurs when the vapor-deposition environment within the manufacturing apparatus becomes partially unbalanced. The resulting sensitivity unevenness occurs in a direction perpendicular to the axis of rotation of the photosensitive drum. The sensitivity characteristic of the photosensitive drum along the main-scanning direction thereof (the vertical direction in the drawings) varies at a substantially constant inclination along the main-scanning direction. On the other hand, a variation in the sensitivity characteristic along the sub-scanning direction (the horizontal direction in the drawings) is slight.

FIG. 5B illustrates a variation in film thickness that occurs owing to unevenness in the rotation of a rotating device provided in the manufacturing apparatus. The resulting sensitivity unevenness occurs in part in a direction parallel to the direction perpendicular to the axis of rotation. In this case, the sensitivity characteristic along the main-scanning direction varies in accordance with the main-scan position. Further, the sensitivity characteristic along the sub-scanning direction varies in accordance with the sub-scan position. In particular, a large variation in sensitivity occurs at the central portion of the sub-scan position, and there is little variation in sensitivity at the end portions of the sub-scan position.

FIG. 5C illustrates a variation in film thickness that occurs owing to the fact that the axis of rotation of the rotating device in the manufacturing apparatus and the axis of rotation of the photosensitive drum do not coincide. The resulting sensitivity unevenness occurs in a direction parallel to a direction perpendicular to the axis of rotation. Although the sensitivity characteristic varies in accordance with the main-scan position and sub-scan position, the sensitivity characteristics at the two ends of the photosensitive drum are opposite each other.

[Method of Generating Sensitivity Correction Value]

Figure 6:
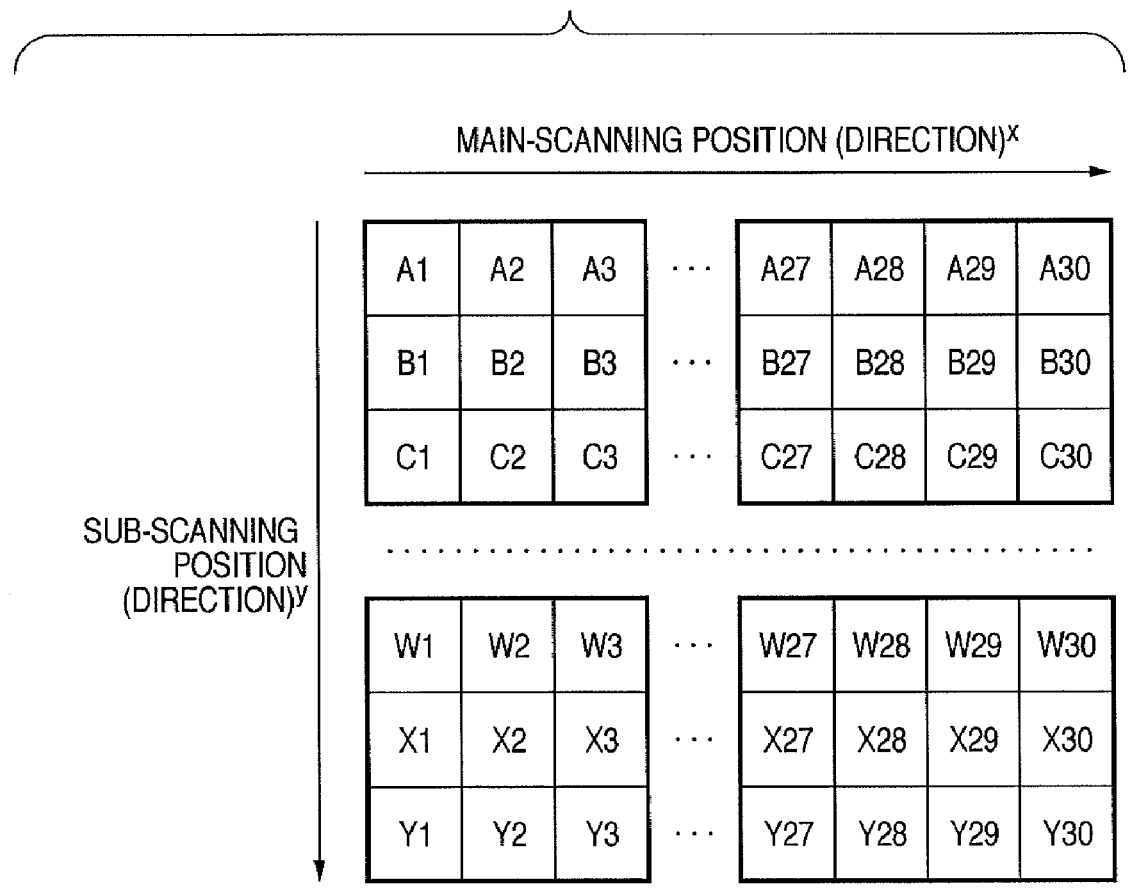
FIG. 6 is a diagram illustrating the manner in which the surface of a photosensitive drum is divided into a plurality of areas according to the embodiment.

FIG. 6 is a diagram illustrating the manner in which the surface of a photosensitive drum is divided into a plurality of areas according to this embodiment. In general, the surface of the photosensitive drum 110 is rectangular when developed. The rectangle is divided into P columns in the main-scanning direction and Q rows in the sub-scanning direction using the home position as a reference. As a result, a total of P×Q areas are formed. Here P is determined in accordance with the width of the area in which a latent image is actually formed on the surface of the photosensitive drum, and Q is determined in accordance with the perimeter of the photosensitive drum. For example, if the width of the area in which the latent image is formed is 300 mm, then it will suffice if P=30 holds. If the perimeter is 251 mm, then it will suffice if Q=25 holds. Although these numerical values are merely illustrative, it will be assumed below for descriptive purposes that P=30, Q=25 holds.

A first (Ath) row includes areas A1 to A30. A $25^{th}$ (Yth) line includes areas Y1 to Y30. A first column includes areas A1 to Y1. A $30^{th}$ column includes areas A30 to Y30.

At the time of shipping from the factory, the sensitivity of each area on the surface of the photosensitive drum is measured, and the measured value is stored in the EEPROM 241 as sensitivity data. It should be noted that sensitivity data of a pth column and qth row can be expressed by S(p,q). For example, the sensitivity data of area A1 is expressed by S(1, 1). Further, the sensitivity data of area A30 is expressed by S(30,1), and the sensitivity area of area X1 is expressed by S(1,25).

Figure 7:
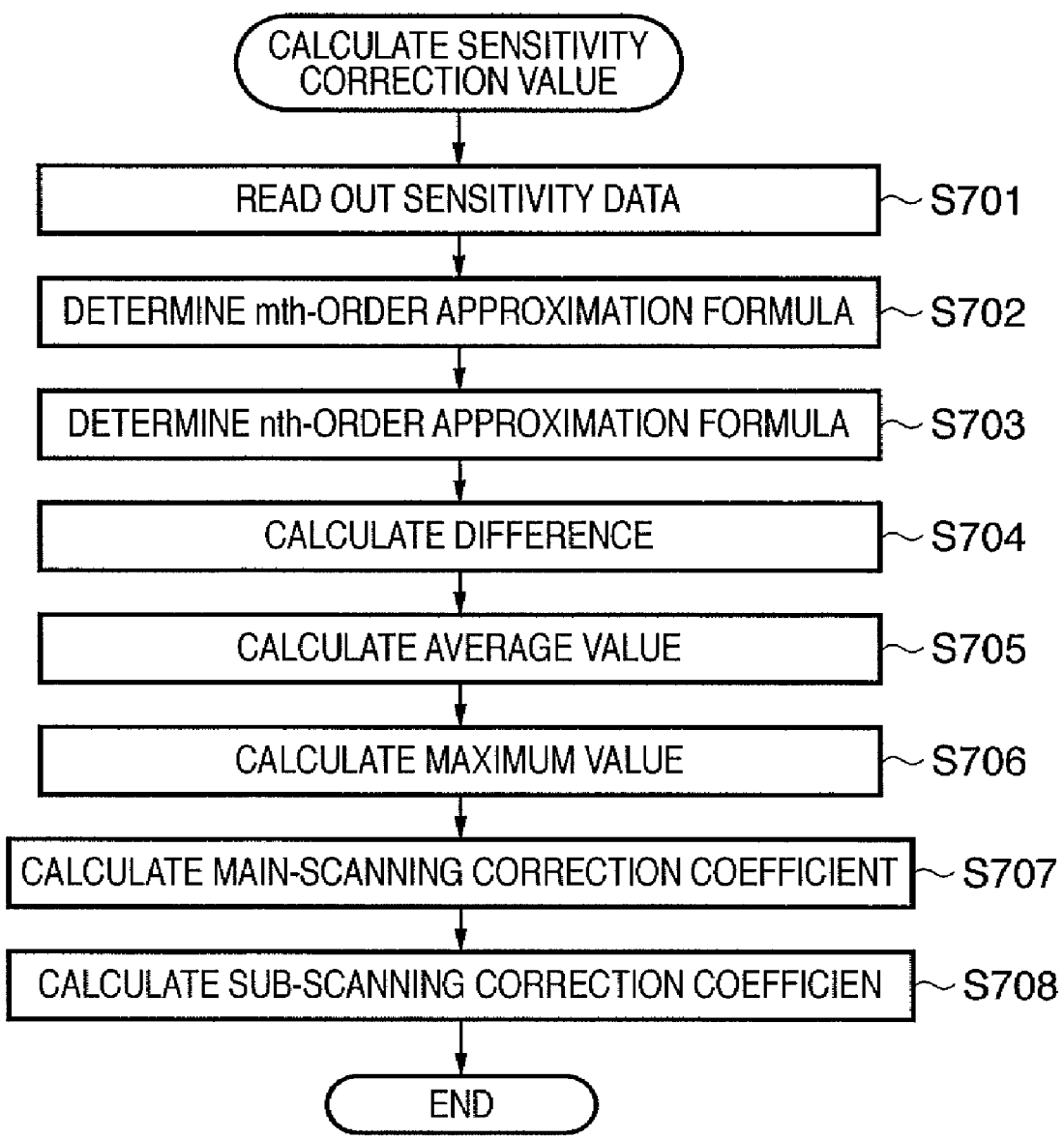
FIG. 7 is a flowchart illustrating an example of a method of calculating a sensitivity correction value according to the embodiment.

FIG. 7 is a flowchart illustrating an example of a method of calculating a sensitivity correction value according to this embodiment. In step S701, the necessary sensitivity data enters the sensitivity correction value arithmetic unit 401 from the backup memory 230 through the engine controller 210. In accordance with the example illustrated in FIG. 6, a total of 750 items of sensitivity data enter.

If the corner (home position) at the upper left of area A1 is considered to be the origin, the number of positions in the sub-scanning direction is 25 and the number of positions in the main-scanning direction is 31. The reason why the number in the sub-scanning direction is not 26 is that positions 0 and 26 in the sub-scanning direction are the same point (note that the sub-scanning direction is the circumferential direction). Accordingly, in this case the total number of items of sensitivity data is 771. If main-scan position x ($0 \leq x \leq 31$) and sub-scan position y ($0 \leq y \leq 25$) are used, sensitivity data of each area can be expressed by S(x,y).

In step S702, the sensitivity correction value arithmetic unit 401 determines an mth-order approximation formula (where m is a natural number), which represents the sensitivity characteristic of the photosensitive drum in the main-scanning direction, from the sensitivity data representing the sensitivity of each area. That is, with regard to each Q row, the sensitivity correction value arithmetic unit 401 determines the mth-order approximation formula from each item of sensitivity data of P-number of areas along the main-scanning direction. Although m=4 is assumed here, it will suffice if m is a natural number greater than n. For example, the sensitivity correction value arithmetic unit 401 determines a fourth-order approximation formula FHq(p) from each item of sensitivity data of each area belonging to the qth row (if Q=25 holds, then q=1 to 25). That is, a total of Q-number of fourth-order approximation formulae are generated. The fourth-order approximation formula of the first row is represented by $FH_1(p)$.

In step S703, the sensitivity correction value arithmetic unit 401 determines an nth-order approximation formula (where n is a natural number that is less than m), which represents the sensitivity characteristic of the photosensitive drum in the main-scanning direction, from the sensitivity data representing the sensitivity of each area. That is, with regard to each row, the sensitivity correction value arithmetic unit 401 determines the nth-order approximation formula from each item of sensitivity data of P-number of areas along the main-scanning direction. Here n=1 is assumed to hold for the sake of description. The sensitivity correction value arithmetic unit 401 determines Q-number of first-order approximation formulae FLq(p) from the Q-number of fourth-order approximation formulae that have been generated. The first-order approximation formula of the first row is represented by $FL_1(p)$.

In step S704, with regard to each area, the sensitivity correction value arithmetic unit 401 calculates a difference value $\Delta(p,q)$ from the corresponding fourth-order approximation formula and first-order approximation formula. Thus, with regard to each of the areas, difference values between corresponding nth-order approximation formulae and mth-order approximation formulae are calculated. When this is performed, a difference approximation formula $F\Delta q(p)=FHq(p)-FLq(p)$ may be generated with regard to each row.

In step S705, for every column of the P-number of columns, the sensitivity correction value arithmetic unit 401 calculates average values of difference values regarding Q-number of areas belonging to the column. If P=30 holds, 30 average values are obtained. At this time the sensitivity correction value arithmetic unit 401 again determines a fourth-order approximation formula FH'q(p) from the calculated average values of every column. That is, an mth-order approximation formula FH'q(p) is determined from the calculated P-number of average values.

In step S706, the sensitivity correction value arithmetic unit 401 calculates maximum values (first maximum values) from respective ones of the fourth-order approximation formulae FH'q(p) generated. Further, the sensitivity correction value arithmetic unit 401 calculates maximum values (second maximum values) from respective ones of the first-order approximation formulae FLq(p) generated row by row. The second maximum values are used as set values of amount of light emission from the semiconductor laser.

In step S707, the sensitivity correction value arithmetic unit 401 divides the sensitivity data of each area by the respective corresponding first maximum value. As a result, the main-scan correction coefficient CP, which is the correction coefficient in the main-scanning direction, is calculated.

In step S708, the sensitivity correction value arithmetic unit 401 divides the sensitivity data of each area by the respective corresponding second maximum value. As a result, the sub-scan correction coefficient CS, which is the correction coefficient in the sub-scanning direction, is calculated.

Thereafter, in accordance with these sensitivity correction values, the driving current control circuit 207 and bias current control circuit 321 control the bias current Ib applied to the light source. As a result, the surface potential in the dark portions of the latent image becomes uniform.

Furthermore, the driving current control circuit 207 and switching current control circuit 320 control the switching current Isw in accordance with the sensitivity correction values, whereby the surface potential in the highlight portions of the latent image is rendered uniform.

Figure 8A:
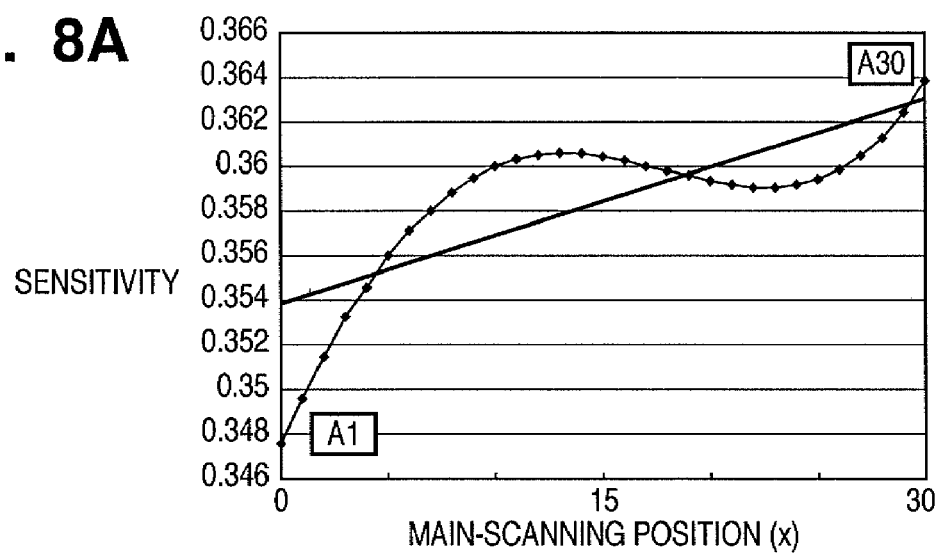
FIGS. 8A to 8C are diagrams illustrating examples of a fourth-order approximation formula and a first-order approximation formula determined with regard to a first (A) row.
Figure 8B:
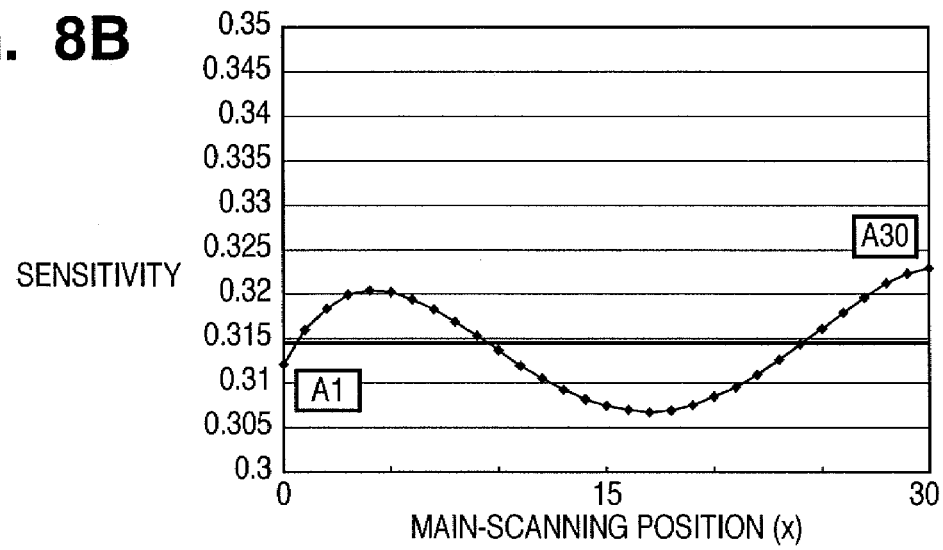
Figure 8C:
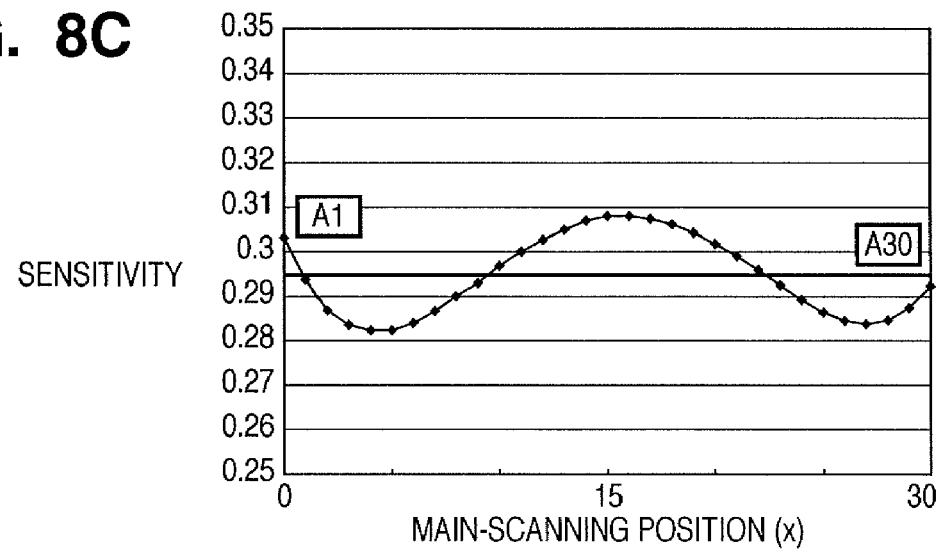

FIGS. 8A, 8B and 8C are diagrams illustrating examples of a fourth-order approximation formula and a first-order approximation formula determined with regard to the first (Ath) row. In particular, FIG. 8A illustrates an approximation formula obtained with regard to a photosensitive drum of the kind shown in FIG. 5A, FIG. 8B illustrates an approximation formula obtained with regard to a photosensitive drum of the kind shown in FIG. 5B, and FIG. 8C illustrates an approximation formula obtained with regard to a photosensitive drum of the kind shown in FIG. 5C.

Figure 9A:
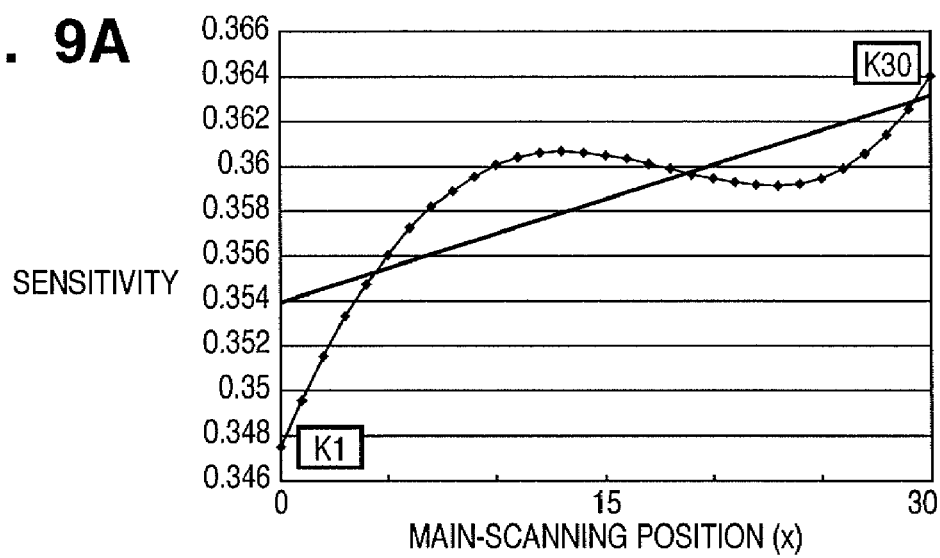
FIGS. 9A to 9C are diagrams illustrating examples of a fourth-order approximation formula and a first-order approximation formula determined with regard to an 11th (K) row.
Figure 9B:
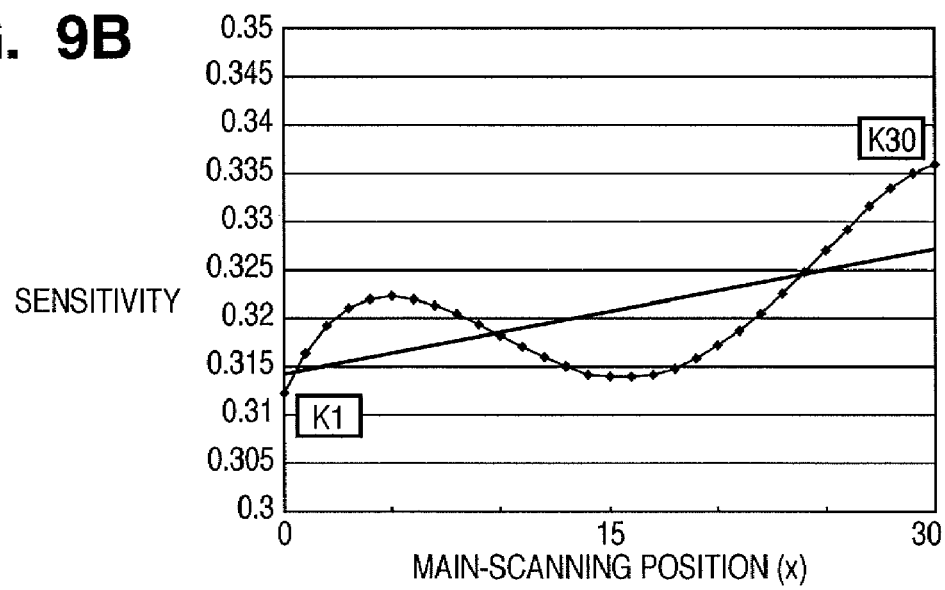
Figure 9C:
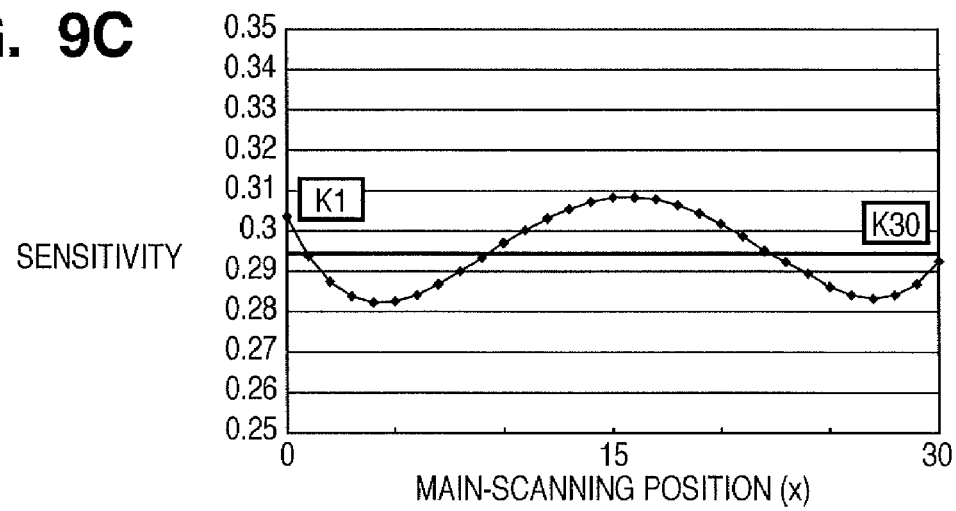

FIGS. 9A, 9B and 9C are diagrams illustrating examples of a fourth-order approximation formula and a first-order approximation formula determined with regard to the 11th (Kth) row. In particular, FIG. 9A illustrates an approximation formula obtained with regard to a photosensitive drum of the kind shown in FIG. 5A, FIG. 9B illustrates an approximation formula obtained with regard to a photosensitive drum of the kind shown in FIG. 5B, and FIG. 9C illustrates an approximation formula obtained with regard to a photosensitive drum of the kind shown in FIG. 5C.

FIGS. 10A, 10B and 10C are diagrams illustrating examples of a fourth-order approximation formula and a first-order approximation formula determined with regard to the 24th (Xth) row. In particular, FIG. 10A illustrates an approximation formula obtained with regard to a photosensitive drum of the kind shown in FIG. 5A, FIG. 10B illustrates an approximation formula obtained with regard to a photosensitive drum of the kind shown in FIG. 5B, and FIG. 10C illustrates an approximation formula obtained with regard to a photosensitive drum of the kind shown in FIG. 5C.

First, focusing on FIGS. 8A, 9A and 10A corresponding to FIG. 5A, the slopes of the first-order approximation formula and the offset values (the value of the intercept with the vertical axis) are substantially constant and are not dependent upon the sub-scan position. The reason for this is that the sensitivity characteristic of the photosensitive drum 110 has linear symmetry with respect to the axis of rotation at the time of vapor deposition.

Next, focusing on FIGS. 8B, 9B and 10B corresponding to FIG. 5B, the slopes of the first-order approximation formula increase from the first to the $11^{th}$ rows but decrease from the $11^{th}$ to the $24^{th}$ rows. Furthermore, the offset values in the first approximation formula are substantially the same value in any row.

Focusing on FIGS. 8C, 9C and 10C corresponding to FIG. 5C, the slopes of the first-order approximation formula appear to be zero in FIGS. 8C, 9C and 10C. However, the reason for this is that the slopes of the first-order approximation formula corresponding to the sixth row and $19^{th}$ row, etc., are not illustrated. The actual slope of the first-order approximation formula increases from the first row to the sixth row and decreases from the sixth row to the $19^{th}$ row. Furthermore, the slope increases from the $19^{th}$ row to the $24^{th}$ row.

Thus, it can be appreciated that the first-order approximation formulae and fourth-order approximation formulae of sensitivity differ in accordance with sensitivity unevenness in every area possessed by the photosensitive drum 110.

Figure 11A:
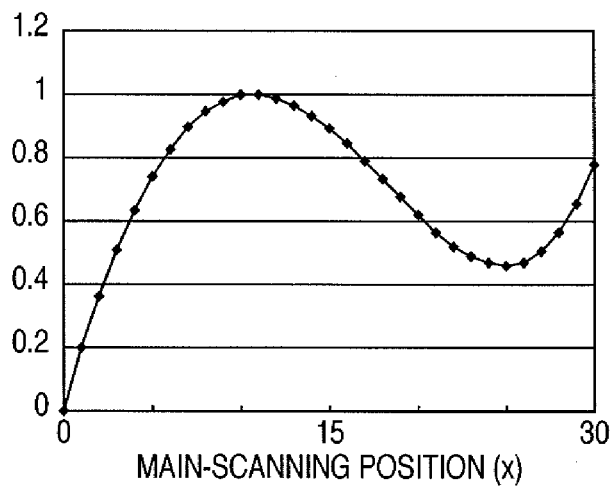
FIGS. 11A to 11C are diagrams illustrating examples of main-scan correction coefficients.
Figure 11B:
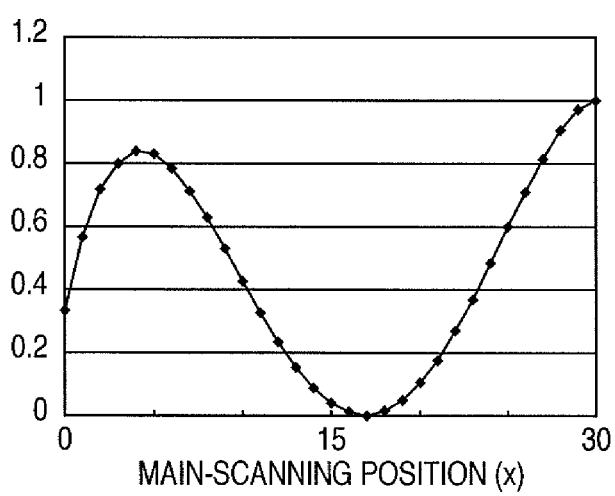
Figure 11C:
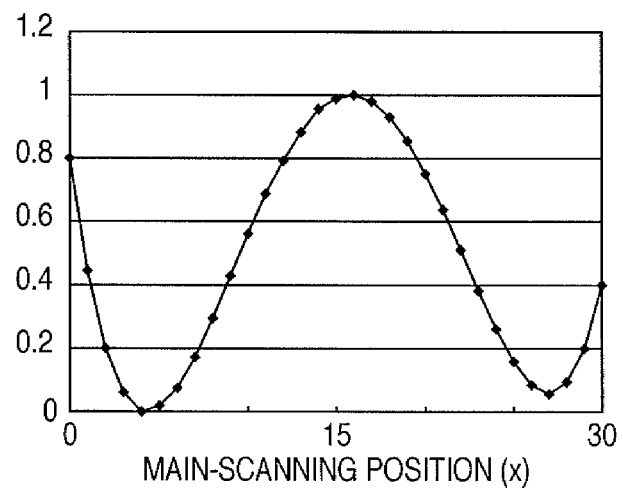

FIGS. 11A, 11B and 11C are diagrams illustrating examples of main-scan correction coefficients. In particular, FIGS. 11A, 11B and 11C correspond to FIGS. 5A, 5B and 5C, respectively. It will be understood from these diagrams that the main-scan correction coefficients change in accordance with the sensitivity of each area. It should be noted that the driving current is corrected in such a manner that the larger the value of the correction coefficient, the greater the amount of light from the semiconductor laser.

Figure 12A:
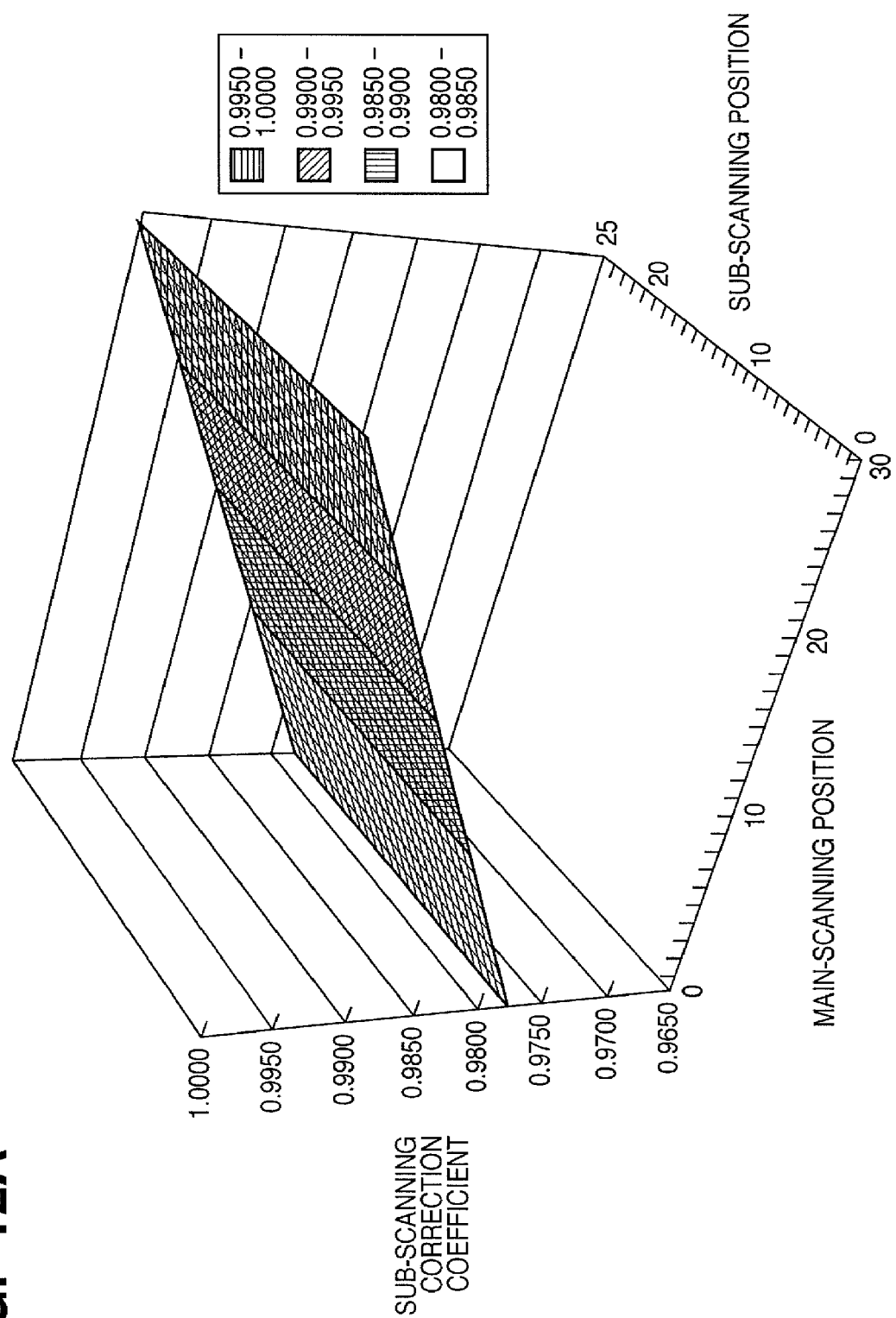
Figure 12C:
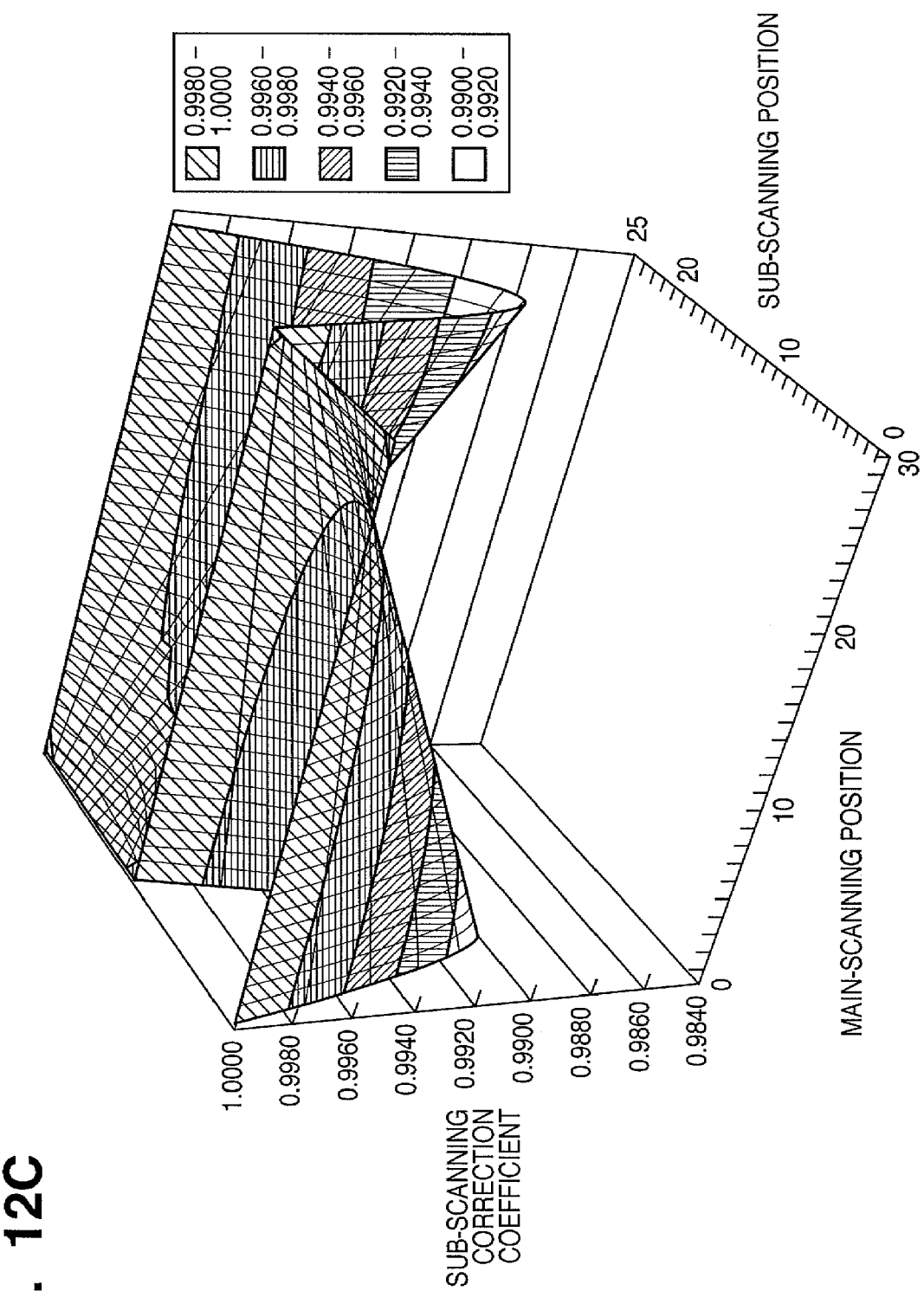

FIGS. 12A, 12B and 12C are diagrams illustrating examples of sub-scan correction coefficients. In particular, FIGS. 12A, 12B and 12C correspond to FIGS. 5A, 5B and 5C, respectively. It will be understood from these diagrams that the sub-scan correction coefficients change in accordance with the sensitivity of each area.

Figure 13:
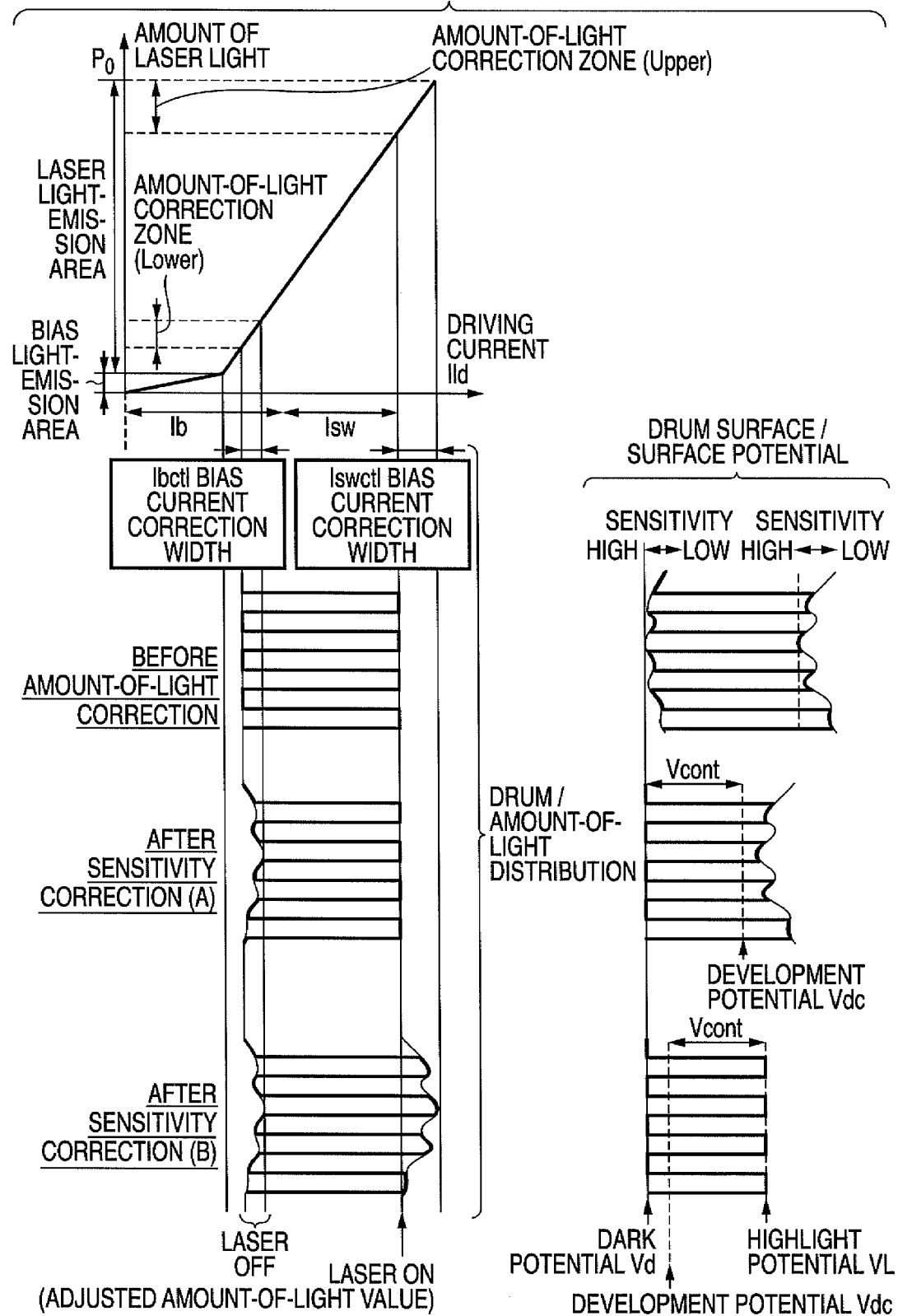
FIG. 13 is a diagram illustrating an example of a method of correcting potential of a latent image on a photosensitive drum according to the embodiment.

FIG. 13 is a diagram illustrating an example of a method of correcting potential of a latent image on a photosensitive drum according to this embodiment. The following can be understood if attention is directed toward the amount-of-light distribution and surface potential in FIG. 13 before the amount of light is corrected: Although the amount of light with which the photosensitive drum 110 is irradiated is held constant, uniformity is not maintained in the surface potential (highlight voltage VL) of highlight portions of the latent image and surface potential (dark potential Vd) of dark portions of the latent image.

Next, with regard to the situation after the sensitivity correction (A), which is the result of correction only of bias current, only dark current Vd is corrected by controlling the bias current Ib of the semiconductor laser in accordance with the sensitivity correction value that has been output by the sensitivity correction value generator. In case of background exposure, contrast voltage $V_{cont}$ is determined by dark potential Vd and development potential Vdc.

The situation after the sensitivity correction (B) indicates that dark potential Vd and highlight potential VL have been corrected by controlling the switching current Isw in addition to bias current. In the case of image exposure, the contrast voltage $V_{cont}$ is determined by development potential Vdc and highlight potential VL.

In accordance with this embodiment, the surface potential in dark portions of a latent image can be made uniform by controlling the bias current applied to a light source in accordance with a sensitivity correction value. Furthermore, in accordance with this embodiment, the surface potential in highlight portions of the latent image can also be made uniform by controlling the switching current applied to the light source in accordance with the sensitivity correction value.

In particular, it is possible for surface potential to be maintained in a desired state by dividing the surface of the photosensitive drum to P x Q areas, finding sensitivity correction values from correction coefficients in the main-scanning direction and correction coefficients in the sub-scanning direction obtained with regard to each of the areas, and adjusting the amount of light using these sensitivity correction values.

It should be noted that the sensitivity data differs for every photosensitive drum. It is preferred, therefore, that sensitivity data that has been measured separately be input to the sensitivity correction value generator. For example, if a photosensitive drum is provided with a storage unit (memory or RFID tag) storing sensitivity data, it would be possible to maintain the surface potential in the prescribed state even if the photosensitive drum is replaced.

Other Embodiments

Figure 14:
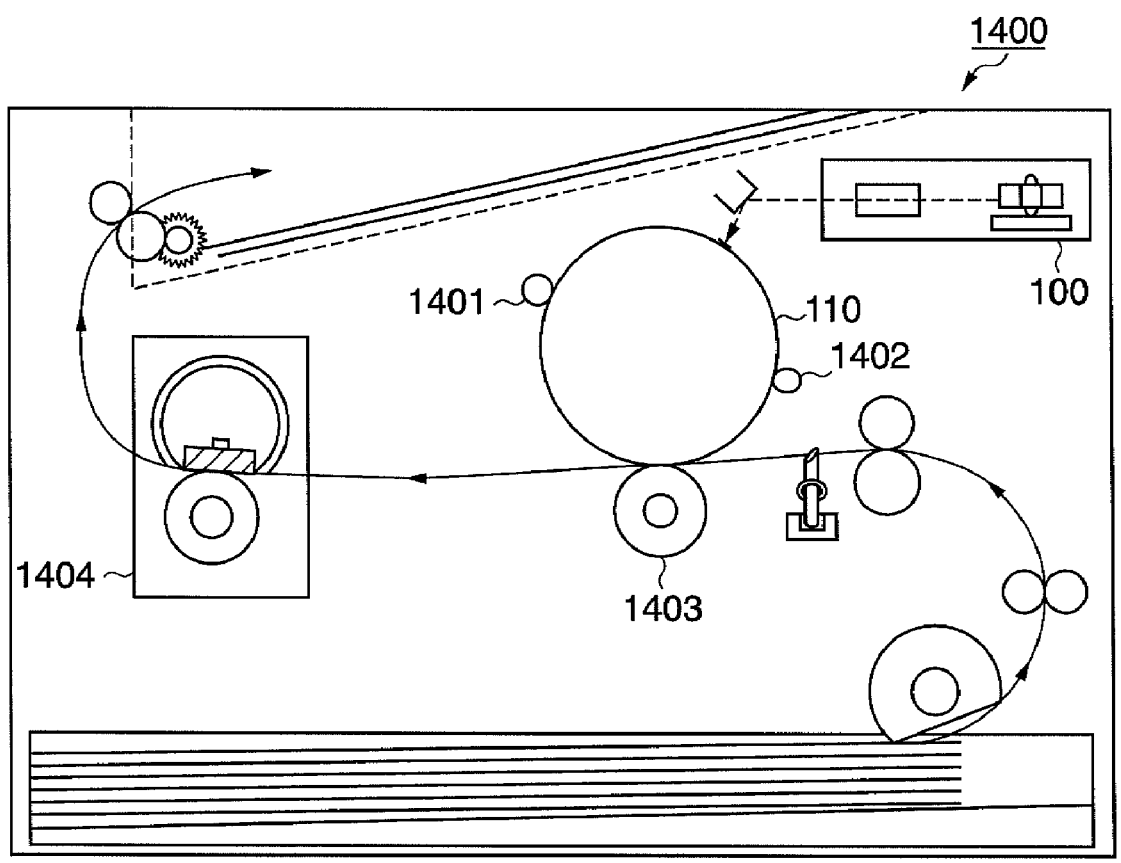
FIG. 14 is a schematic sectional view of an image forming apparatus according to the embodiment.

Here an image forming apparatus will be described as an example of application of the above-described optical scanning apparatus 100. FIG. 14 is a schematic sectional view of an image forming apparatus 1400 according to this embodiment. The image forming apparatus 1400 forms a monochrome or multicolor image. By way of example, the image forming apparatus 1400 is implemented as a printing apparatus, image output apparatus, printer, copier, multifunction peripheral or facsimile machine.

The optical scanning apparatus 100 scans the surface of the photosensitive drum 110, which has been uniformly charged by a charging device 1401, with a light beam. An electrostatic latent image corresponding to an image signal is formed on the photosensitive drum 110, which is one example of an image carrier. Further, the electrostatic latent image is converted to a developer (toner) image by a developing unit 1402. The developer image is transferred to a printing medium by a transfer unit 1403. A fixing unit 1404 fixes the developer image on the printing medium to which the developer image has been transferred from the photosensitive drum 110. The printing medium may also be referred to as printing paper, a sheet or transfer material, etc.

It should be noted that although the EEPROM 241 may be provided directly on the photosensitive drum 110, it is preferred that the EEPROM 241 be provided on a process cartridge containing the photosensitive drum 110. The reason for this is that the photosensitive drum 110 is replaced in removable fashion by replacing the entire process cartridge.

In accordance with this embodiment, unevenness in the density of an image ascribable to sensitivity unevenness of the photosensitive drum can be reduced by mounting the above-described optical scanning apparatus 100 on the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-119618, filed Apr. 27, 2007, which is hereby incorporated by reference herein in its entirety.

What is claimed is:

1. An optical scanning apparatus for irradiating an image carrier with a light beam emitted from a light source, comprising:

an approximation formula determination unit which determines an nth-order approximation formula and an mth-order approximation formula (where n and m are natural numbers and m>n holds), which represent the sensitivity characteristic of the image carrier along the main-scanning direction thereof, from sensitivity data representing the sensitivity of each area obtained by dividing the surface of the image carrier into a plurality of areas;

a sensitivity correction value determination unit which determines a sensitivity correction value, which is a correction value of sensitivity in each area, from the nth-order approximation formula and mth-order approximation formula; and a bias current controller which controls a bias current, which is applied to the light source, in accordance with the sensitivity correction values, wherein the surface of the image carrier is divided into P-number of columns in the main-scanning direction and Q-number of rows in the sub-scanning direction, thereby dividing the surface into a total of P×Q areas;

said approximation formula determination unit includes a part which, with regard to each row of the Q-number of rows, determines the nth-order approximation formula and the mth-order approximation formula from each item of sensitivity data of P-number of areas along the main-scanning direction; and said sensitivity correction value determination unit includes:

a part which, with regard to each area, calculates a difference value between the corresponding nth-order approximation formula and the mth-order approximation formula;

a part which, with regard to each column of the P-number of columns, calculates an average value of the difference values regarding Q-number of areas belonging to each column;

a part which determines the mth-order approximation formula from the calculated P-number of average values and calculates a first maximum value from the mth-order approximation formula determined;

a part which divides the sensitivity data of each area by the respective first maximum value, thereby calculating a correction coefficient in the main-scanning direction;

a part which, with regard to each row of the Q-number of rows, calculates a second maximum value from the corresponding nth-order approximation formula;

a part which divides the sensitivity data of each area by the respective second maximum value, thereby calculating a correction coefficient in the sub-scanning direction; and a part which, with regard to each area, adds the correction coefficient in the main-scanning direction and the correction coefficient in the sub-scanning direction, thereby calculating the sensitivity correction value.

2. The apparatus according to claim 1, further comprising:

an amount-of-light control unit which controls the amount of light, which is output from the light source, so as to obtain a target amount of light; and a switching current control unit which controls a switching current, which is applied to the light source, in accordance with the sensitivity correction value and a current value that is for obtaining the target amount of light determined by said amount-of-light control unit.

3. The apparatus according to claim 1, further comprising a readout unit which reads the sensitivity data out of a storage unit provided on the image carrier.

4. The apparatus according to claim 1, further comprising an input unit which inputs the sensitivity data.

5. An image forming apparatus comprising:

an image carrier;

a charging unit which charges said image carrier;

an optical scanning apparatus for irradiating an image carrier with a light beam emitted from a light source, said optical scanning apparatus forming an electrostatic latent image by scanning the surface of the image carrier with a light beam that conforms to image information;

a developing unit which forms a developer image by developing the electrostatic latent image;

a transfer unit which transfers the developer image to printing paper; and a fixing unit which fixes the transferred developer image to the printing paper, wherein said optical scanning apparatus includes:

an approximation formula determination unit which determines an nth-order approximation formula and an mth-order approximation formula (where n and m are natural numbers and m>n holds), which represent the sensitivity characteristic of the image carrier along the main-scanning direction thereof, from sensitivity data representing the sensitivity of each area obtained by dividing the surface of the image carrier into a plurality of areas;

a sensitivity correction value determination unit which determines a sensitivity correction value, which is a correction value of sensitivity in each area, from the nth-order approximation formula and mth-order approximation formula; and a bias current controller which controls a bias current, which is applied to the light source, in accordance with the sensitivity correction value, wherein the surface of the image carrier is divided into P-number of columns in the main-scanning direction and Q-number of rows in the sub-scanning direction, thereby dividing the surface into a total of P×Q areas;

said approximation formula determination unit includes a part which, with regard to each row of the Q-number of rows, determines the nth-order approximation formula and the mth-order approximation formula from each item of sensitivity data of P-number of areas along the main-scanning direction; and said sensitivity correction value determination unit includes:

a part which, with regard to each area, calculates a difference value between the corresponding nth-order approximation formula and the mth-order approximation formula;

a part which, with regard to each column of the P-number of columns, calculates an average value of the difference values regarding Q-number of areas belonging to each column;

a part which determines the mth-order approximation formula from the calculated P-number of average values and calculates a first maximum value from the mth-order approximation formula determined;

a part which divides the sensitivity data of each area by the respective first maximum value, thereby calculating a correction coefficient in the main-scanning direction;

a part which, with regard to each row of the Q-number of rows, calculates a second maximum value from the corresponding nth-order approximation formula;

a part which divides the sensitivity data of each area by the respective second maximum value, thereby calculating a correction coefficient in the sub-scanning direction; and a part which, with regard to each area, adds the correction coefficient in the main-scanning direction and the correction coefficient in the sub-scanning direction, thereby calculating the sensitivity correction value.

* * * * *